US012387924B2

(12) United States Patent
Yamashita et al.

(10) Patent No.: US 12,387,924 B2
(45) Date of Patent: Aug. 12, 2025

(54) PHOTOMULTIPLIER TUBE INCLUDING A PROTECTIVE LAYER

(71) Applicant: HAMAMATSU PHOTONICS K.K., Hamamatsu (JP)

(72) Inventors: Shinichi Yamashita, Hamamatsu (JP); Daichi Masuko, Hamamatsu (JP); Satoshi Suzuki, Hamamatsu (JP); Taisuke Nakaya, Hamamatsu (JP); Kuniyoshi Mori, Hamamatsu (JP); Rina Konno, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/779,135

(22) Filed: Jul. 22, 2024

(65) Prior Publication Data

US 2025/0037982 A1 Jan. 30, 2025

(30) Foreign Application Priority Data

Jul. 24, 2023 (JP) ................................ 2023-120089
Apr. 26, 2024 (JP) ................................ 2024-073019

(51) Int. Cl.
*H01J 43/12* (2006.01)
*H01J 43/28* (2006.01)

(52) U.S. Cl.
CPC .................................. *H01J 43/12* (2013.01)

(58) Field of Classification Search
CPC ................................ H01J 43/12; H01J 43/28
See application file for complete search history.

(56) References Cited

U.S. PATENT DOCUMENTS 6,174,213 B1 * 1/2001 Paz de Araujo .... C23C 18/1291 427/67
7,612,342 B1 * 11/2009 Nagarkar ........... C09K 11/7719 315/1

(Continued)

FOREIGN PATENT DOCUMENTS

CN 114921765 A 8/2022
JP 2007-242412 A 9/2007

(Continued)

OTHER PUBLICATIONS

"Photomultiplier Handbook, https://psec.uchicago.edu/links/Photomultiplier_Handbook.pdf," Oct. 1989.

*Primary Examiner* — Joseph L Williams
(74) *Attorney, Agent, or Firm* — Faegre Drinker Biddle & Reath LLP

(57) ABSTRACT

Provided is a photomultiplier tube including: a container including a window portion formed of a light-transmitting material, and a tubular portion that is connected to the window portion and defines a vacuum space in combination with the window portion; a photoelectric surface that is formed of a photoelectron-emitting material consisting of sodium, potassium, and antimony, is provided on a first surface of the window portion on a side of the vacuum space, and emits photoelectrons in correspondence with incident light; and an electron multiplier that emits secondary electrons in correspondence with incidence of the photoelectrons emitted from the photoelectric surface, and multiplies the secondary electrons. An aluminum oxide layer is formed between the photoelectric surface and the window portion and on a surface of the tubular portion.

12 Claims, 18 Drawing Sheets

(56) References Cited

U.S. PATENT DOCUMENTS

| | | | | |
|---|---|---|---|---|
| 10,422,888 | B1 * | 9/2019 | Ianakiev | G01T 1/2002 |
| 2021/0242002 | A1 * | 8/2021 | Mckinny | H01J 43/22 |

FOREIGN PATENT DOCUMENTS

| | | | |
|---|---|---|---|
| JP | 2008-166262 | A | 7/2008 |
| JP | 2010-257962 | A | 11/2010 |
| JP | 2019-191047 | A | 10/2019 |
| JP | 2020-030161 | A | 2/2020 |
| JP | 2021-044118 | A | 3/2021 |
| JP | 2022-184055 | A | 12/2022 |

* cited by examiner

*Fig.3*

| N=5 | INCREASE RATE OF AFTER-PULSES |
| --- | --- |
| COMPARATIVE EXAMPLE (WITHOUT ALUMINUM OXIDE LAYER) | 202% |
| FIRST EXAMPLE (10nm) | 178% |
| SECOND EXAMPLE (20nm) | 156% |

*Fig.8*

| No. | MATERIAL | ALKALI BLOCKING EFFECT | FILM FORMATION METHOD |
|---|---|---|---|
| 1 | $Al_2O_3$ | ○ | ALD |
| 2 | AlON (MIXTURE OF $Al_2O_3$ AND AlN) | ○ | ALD |
| 3 | $Y_2O_3$ | ○ | ELECTRON BEAM DEPOSITION |
| 4 | ($SiO_2$/$Al_2O_3$) × THREE-LAYER LAMINATED LAYER | ○ | ALD |
| 5 | $La_2O_3$ | ○ | ELECTRON BEAM DEPOSITION |
| 6 | MgO | × | ALD |
| 7 | $SiO_2$ | × | ALD |
| 8 | $TiO_2$ | × | ALD |
| 9 | $HfO_2$ | × | ELECTRON BEAM DEPOSITION |
| 10 | TaON | × | ALD |
| 11 | $MgF_2$ | × | ALD |
| 12 | NONE (ONLY QUARTZ GLASS) | × | — |

SAMPLE 1

SAMPLE 2

SAMPLE 3

SAMPLE 3

SAMPLE 4

SAMPLE 5

SAMPLE 5

SAMPLE 6

SAMPLE 7

SAMPLE 8

SAMPLE 9

SAMPLE 10

SAMPLE 11

SAMPLE 12

SAMPLE 1

SAMPLE 2

SAMPLE 3

SAMPLE 3

SAMPLE 4

SAMPLE 5

SAMPLE 5

SAMPLE 6

SAMPLE 7

SAMPLE 8

SAMPLE 9

SAMPLE 10

SAMPLE 11

SAMPLE 12

*Fig.17*

| N=5 | INCREASE RATE OF AFTER-PULSES |
|---|---|
| THIRD COMPARATIVE EXAMPLE | 270% |
| THIRD EXAMPLE | 241% |

PHOTOMULTIPLIER TUBE INCLUDING A PROTECTIVE LAYER

TECHNICAL FIELD

An aspect of the present disclosure relates to a photomultiplier tube.

BACKGROUND

Japanese Unexamined Patent Publication No. 2021-044118 discloses a photomultiplier tube in which a photoelectric surface, a multiplier, and a positive electrode are disposed in an evacuated container. In the photomultiplier tube, photoelectrons are emitted from the photoelectric surface in correspondence with incidence of light. The photoelectrons emitted from the photoelectric surface are multiplied in a multiplication portion as secondary electrons, and are collected in the positive electrode. In the photomultiplier tube described in Japanese Unexamined Patent Publication No. 2021-044118, the photoelectric surface is formed of a photoelectron-emitting material containing an alkali metal, and is provided on an inner surface of the container.

SUMMARY

Problems to be Solved by the Invention

The present inventors found that when a photomultiplier tube as described above is used in a high-temperature environment (for example, 175° C. to 200° C.), unique problems may occur. Specifically, in a case where the photomultiplier tube is operated in a high-temperature environment, there is a concern that an alkali metal contained in the photoelectric surface may migrate into the container, and sensitivity of the photoelectric surface may deteriorate. In addition, in the high-temperature environment, a hydrogen gas or a helium gas is likely to permeate through the container and to intrude into the container. Therefore, there is a concern that after-pulses caused by the hydrogen gas or the helium gas may increase.

An objective of an aspect of the present disclosure is to provide a photomultiplier tube capable of suppressing sensitivity deterioration of a photoelectric surface and an increase of after-pulses even in a case of being used in a high-temperature environment.

Means for Solving Problem

A photomultiplier tube according to an aspect of the present disclosure is [1] "a photomultiplier tube including: a container including a window portion formed of a light-transmitting material, and a tubular portion that is connected to the window portion and defines a vacuum space in combination with the window portion; a photoelectric surface that is formed of a photoelectron-emitting material consisting of sodium, potassium, and antimony, is provided on a surface of the window portion on a side of the vacuum space, and emits photoelectrons in correspondence with incident light; and an electron multiplier that emits secondary electrons in correspondence with incidence of the photoelectrons emitted from the photoelectric surface, and multiplies the secondary electrons, wherein a protective layer including a trivalent metal oxide of Group 3 or Group 13 is formed between the photoelectric surface and the window portion and on a surface of the tubular portion".

In the photomultiplier tube, the protective layer including a trivalent metal oxide of Group 3 or Group 13 is formed between the photoelectric surface and the window portion. According to this, even in a case where the photomultiplier tube is operated in a high-temperature environment, it is possible to suppress an alkali metal (sodium and potassium) contained in the photoelectric surface from migrating into the window portion, and it is possible to suppress sensitivity deterioration of the photoelectric surface due to a variation of a composition ratio of the alkali metal constituting the photoelectric surface. In addition, the protective layer is also formed on the surface of the tubular portion. According to this, it is possible to suppress a hydrogen gas or a helium gas from permeating through the tubular portion and intruding into the container in the high-temperature environment, and it is possible to suppress an increase of after-pulses caused by the hydrogen gas or the helium gas. Accordingly, according to the photomultiplier tube, it is possible to suppress the sensitivity deterioration of the photoelectric surface and the increase of the after-pulses even in a case of being used in the high-temperature environment.

The photomultiplier tube according to the aspect of the present disclosure may be [2] "the photomultiplier tube according to [1], wherein the protective layer is formed on a surface of the tubular portion on a side of the vacuum space". In this case, the hydrogen gas or the helium gas can be suppressed from permeating through the tubular portion and intruding into the container from the outside, and in addition to this, the hydrogen gas or the helium gas existing inside the tubular portion can be suppressed from being leaked to the inside of the container, and the increase of the after-pulses can be further suppressed.

The photomultiplier tube according to the aspect of the present disclosure may be [3] "the photomultiplier tube according to [1] or [2], wherein the protective layer is formed on a surface of the tubular portion on a side opposite to the vacuum space". In this case, the increase of the after-pulses can be more effectively suppressed.

The photomultiplier tube according to the aspect of the present disclosure may be [4] "the photomultiplier tube according to any one of [1] to [3], wherein the protective layer is further formed on a surface of the window portion on a side opposite to the vacuum space". In this case, the hydrogen gas or the helium gas is suppressed from permeating through the window portion and intruding into the container.

The photomultiplier tube according to the aspect of the present disclosure may be [5] "the photomultiplier tube according to any one of [1] to [4], wherein the protective layer is an ALD layer". In this case, the protective layer can be densely formed, and the sensitivity deterioration of the photoelectric surface and the increase of the after-pulses can be effectively suppressed.

The photomultiplier tube according to the aspect of the present disclosure may be [6] "the photomultiplier tube according to any one of [1] to [5], wherein the thickness of the protective layer is 10 nm or more and 100 nm or less". In this case, the sensitivity deterioration of the photoelectric surface and the increase of the after-pulses can be effectively suppressed while suppressing transmission of light in the window portion from being blocked by the protective layer.

The photomultiplier tube according to the aspect of the present disclosure may be [7] "the photomultiplier tube according to any one of [1] to [6], wherein the protective layer is an aluminum oxide layer". In this case, the sensitivity deterioration of the photoelectric surface and the increase of the after-pulses can be effectively suppressed.

The photomultiplier tube according to the aspect of the present disclosure may be [8] "the photomultiplier tube according to [7], wherein the thickness of the protective layer is 10 nm or more and 30 nm or less". In this case, the sensitivity deterioration of the photoelectric surface and the increase of the after-pulses can be effectively suppressed while suppressing transmission of light in the window portion from being blocked by the protective layer.

The photomultiplier tube according to the aspect of the present disclosure may be [9] "the photomultiplier tube according to any one of [1] to [6], wherein the protective layer is an yttrium oxide layer". In this case, the sensitivity deterioration of the photoelectric surface and the increase of the after-pulses can be effectively suppressed.

The photomultiplier tube according to the aspect of the present disclosure may be "the photomultiplier tube according to [9], wherein the thickness of the protective layer is 10 nm or more and 100 nm or less". In this case, the sensitivity deterioration of the photoelectric surface and the increase of the after-pulses can be effectively suppressed while suppressing transmission of light in the window portion from being blocked by the protective layer.

According to the aspect of the present disclosure, it is possible to provide a photomultiplier tube capable of suppressing sensitivity deterioration of the photoelectric surface and an increase of after-pulses even in a case of being used in a high-temperature environment.

BRIEF DESCRIPTION OF THE DRAWINGS

FIG. 3 is a table showing a comparison result of after-pulses.

FIG. 8 is a table showing experiment results of the first experiment and the second experiment.

FIG. 17 is a table showing a comparison result of after-pulses according to a third example and a third comparative example.

DETAILED DESCRIPTION

Figure 1:
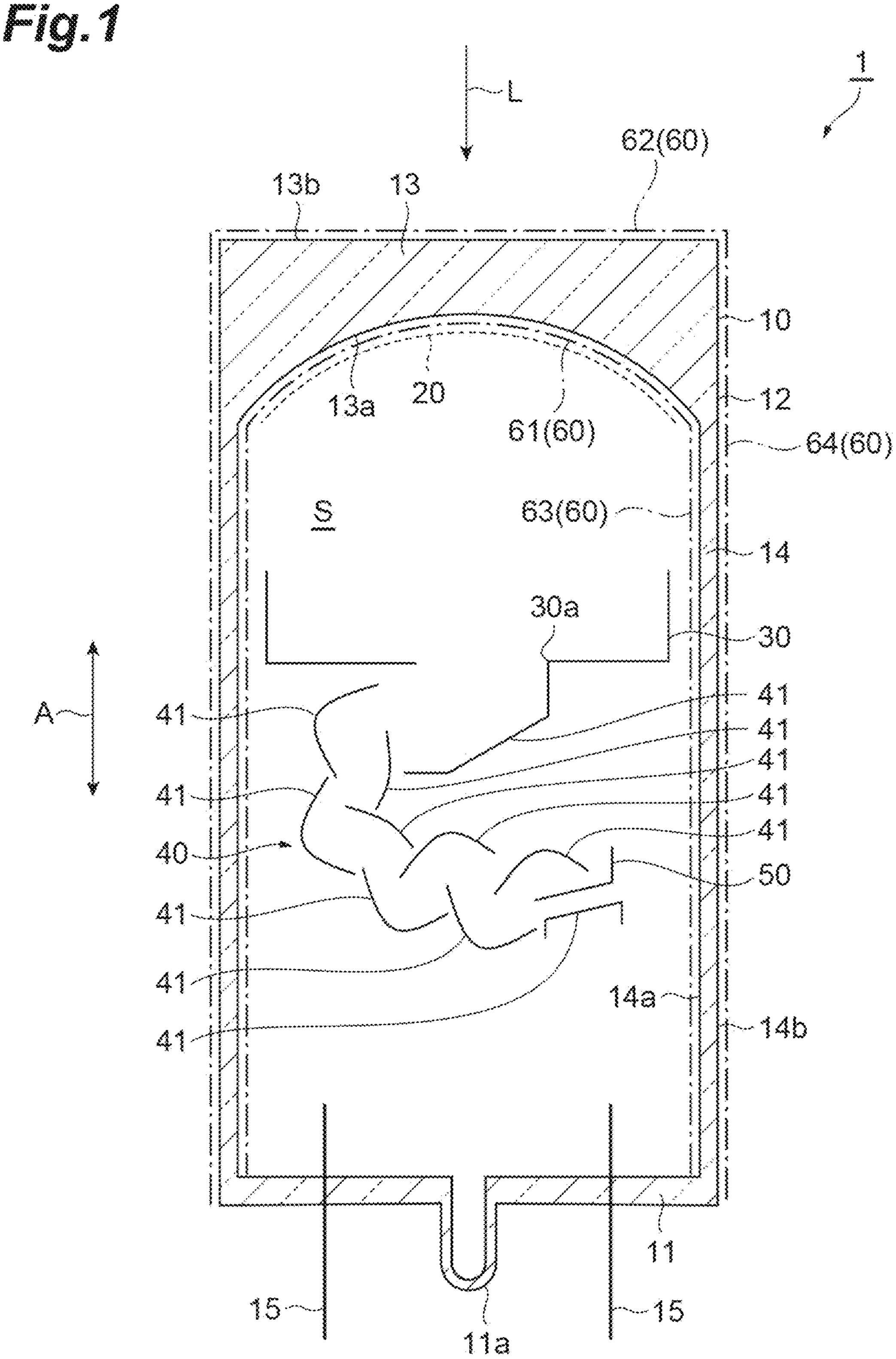
FIG. 1 is a cross-sectional view of a photomultiplier tube according to an embodiment.

Hereinafter, an embodiment of the present disclosure will be described in detail with reference to the accompanying drawings. Note that, in the following description, the same reference numeral will be given to the same or equivalent elements, and redundant description will be omitted.

As illustrated in FIG. 1, a photomultiplier tube 1 (PMT) includes a container 10, a photoelectric surface 20, a focusing electrode 30, an electron multiplier 40, and a positive electrode 50. The photoelectric surface 20, the focusing electrode 30, the electron multiplier 40, and the positive electrode 50 are disposed inside the container 10. The container 10 includes a stem portion 11 and a valve portion 12, and the valve portion 12 is constituted by a window portion 13 and a tubular portion 14.

In the photomultiplier tube 1, light L (incident light) transmitted through the window portion 13 is incident on the photoelectric surface 20, and photoelectrons are emitted from the photoelectric surface 20 in correspondence with the incidence of the light L. The photoelectrons emitted from the photoelectric surface 20 are focused by the focusing electrode 30, are multiplied as secondary electrons in the electron multiplier 40, and are collected in the positive electrode 50. According to this, the photomultiplier tube 1 functions as a photodetector. The photomultiplier tube 1 in this example is a PMT for high temperature which can be used in a high temperature environment (for example, 175° C. to 200° C.), and can be used, for example, for oil exploration and the like. Hereinafter, configurations of respective portions will be described.

The container 10 is formed of, for example, a light-transmitting material such as glass. The container 10 is air-tightly sealed, and defines a vacuum space S at the inside thereof. The stem portion 11 is formed, for example, in an approximately circular plate shape. A cylindrical protruding portion 11*a* that protrudes to a side opposite to the vacuum space S is formed at the central portion of the stem portion 11. A plurality of stem pins 15 penetrating through the stem portion 11 along a direction A (direction parallel to a central line of the tubular portion 14) are fixed to the stem portion 11.

As described above, the valve portion 12 includes the window portion 13 and the tubular portion 14. The window portion 13 is a plane plate (substrate) in the valve portion 12, and is formed, for example, in an approximately circular plate shape. The window portion 13 has a first surface 13*a* (inner surface) on a side of the vacuum space S, and a second surface 13*b* (outer surface) on a side opposite to the first surface 13*a* (vacuum space S). In this example, the first surface 13*a* is a curved surface that is curved in an approximately spherical so as to be recessed toward a side opposite to the vacuum space S, and the second surface 13*b* is a flat surface orthogonal to the direction A.

The tubular portion 14 is a side tube portion in the valve portion 12, and is formed, for example, in a cylindrical shape having a central line parallel to the direction A. One end of the tubular portion 14 is connected to an outer edge portion of the window portion 13, and the other end of the tubular portion 14 is connected to an outer edge portion of the stem portion 11. The above-described vacuum space S is defined by the stem portion 11, the window portion 13, and the tubular portion 14.

The photoelectric surface 20 is provided in a thin film shape on the first surface 13*a* of the window portion 13. The photoelectric surface 20 is formed over approximately the entirety of the first surface 13*a*, and is curved and extends along the first surface 13*a*. In this embodiment, as to be described later, an aluminum oxide layer 60 (protective layer) is formed between the first surface 13*a* and the photoelectric surface 20, and the photoelectric surface 20 is provided on the first surface 13*a* through the aluminum oxide layer 60.

The photoelectric surface 20 is formed of a photoelectron-emitting material that emits photoelectrons in correspondence with incidence of light. In this example, the photoelectron-emitting material constituting the photoelectric surface 20 contains antimony (Sb), and sodium (Na) and potassium (K) which are alkali metals. In this case, the photoelectric surface 20 can be obtained by causing sodium and potassium to react with antimony to be activated. For example, the photoelectric surface 20 is an $Na_2K$ photoelectric surface containing $Na_2K$ in which a molar ratio between Na and K is 2:1. The $Na_2K$ photoelectric surface shows a low noise property. The low noise property represents that a current (dark current) flowing in a state in which the light L is not incident on the photoelectric surface 20 is small during operation of the photomultiplier tube 1. The photoelectric surface 20 functions as a photoelectric negative electrode that emits photoelectrons in correspondence with incident of the light L.

The focusing electrode 30 focuses the photoelectrons emitted from the photoelectric surface 20. The focusing electrode 30 is disposed to face the window portion 13. An opening 30*a* is formed at the center of the focusing electrode 30. The opening 30*a* functions as an inlet for causing the photoelectrons emitted from the photoelectric surface 20 to be incident to the electron multiplier 40.

The electron multiplier 40 is provided between the focusing electrode 30 and the positive electrode 50. The electron multiplier 40 emits the secondary electrons in correspondence with incidence of the photoelectrons arriving from the focusing electrode 30 and multiplies these secondary electrons. For example, the electron multiplier 40 is constituted by a plurality of (ten, in this example) diodes 41. The plurality of diodes 41 are arranged in multi-stages between the focusing electrode 30 and the positive electrode 50. Each of the diodes 41 is formed in a curved shape or a flat plate shape, and emits secondary electrons toward a diode 41 in a next stage by collision of the secondary electrons emitted from a diode 41 in a front stage. According to this, the secondary electrons are sequentially multiplied. The multiplied secondary electrons are collected by the positive electrode 50. Note that, the electron multiplier 40 may have any configuration as long as the electron multiplier 40 can emit and multiply secondary electrons in correspondence with incidence of photoelectrons.

The photomultiplier tube 1 further includes the aluminum oxide layer 60. The aluminum oxide layer 60 includes a first portion 61, a second portion 62, a third portion 63, and a fourth portion 64. The first portion 61 is formed over the entirety of the first surface 13*a* of the window portion 13 on a side of the vacuum space S. The first portion 61 is interposed between the first surface 13*a* of the window portion 13 and the photoelectric surface 20. In other words, the photoelectric surface 20 is provided on the first surface 13*a* via the first portion 61.

The second portion 62 is formed on the entirety of the second surface 13*b* of the window portion 13 on a side opposite to the vacuum space S. The third portion 63 is formed on the entirety of a surface 14*a* (inner surface) of the tubular portion 14 on a side of the vacuum space S. The fourth portion 64 is formed on the entirety of a surface 14*b* (outer surface) of the tubular portion 14 on a side opposite to the vacuum space S. The first portion 61 and the third portion 63 are connected to each other, and are integrally formed. The second portion 62 and the fourth portion 64 are connected to each other and are integrally formed. The aluminum oxide layer 60 is not formed on the stem portion 11.

The aluminum oxide layer 60 is, for example, an ALD layer. The ALD layer is a layer formed by an atomic layer deposition (ALD) method. The atomic layer deposition method is a method for depositing atomic layers one by one to obtain a thin film by repeating a process of absorbing compound molecules, a film formation process by reaction, and a purge process of removing excessive molecules. The aluminum oxide layer 60 is formed in a uniform thickness by the ALD method.

As an example, when manufacturing the photomultiplier tube 1, the aluminum oxide layer 60 is formed on entire surfaces (that is, the first surface 13*a*, the second surface 13*b*, the surface 14*a*, and the surface 14*b*) of the window portion 13 and the tubular portion 14 by the ALD method. Then, the stem portion 11 is fused to an end portion of the tubular portion 14 and the container 10 is sealed. For example, the thickness of the aluminum oxide layer 60 is 10 nm or more and 100 nm or less (100 Å or more and 1000 Å or less), and preferably from 10 nm or more and 30 nm or less (100 Å or more and 300 Å or less). For example, the aluminum oxide layer 60 is formed of aluminum oxide ($Al_2O_3$, alumina).

[Function and Effect]

In the photomultiplier tube 1, the first portion 61 of the aluminum oxide layer 60 (protective layer) is formed between the photoelectric surface 20 and the window portion 13. According to this, even when the photomultiplier tube 1 is operated in a high-temperature atmosphere, it is possible to suppress an alkali metal contained in the photoelectric surface 20 from migrating into the window portion 13 (alkali blocking), and it is possible to suppress sensitivity deterioration of the photoelectric surface 20 due to a variation of the composition ratio of the alkali metal constituting the photoelectric surface 20. In addition, the third portion 63 and the fourth portion 64 of the aluminum oxide layer 60 are formed on the surface of the tubular portion 14. According to this, it is possible to suppress a hydrogen gas or a helium gas from permeating through the tubular portion 14 and intruding into the container 10 in a high-temperature environment (raising gas barrier properties), and thus it is possible to suppress an increase of the after-pulses caused by the hydrogen gas or the helium gas. Accordingly, according to the photomultiplier tube 1, the sensitivity deterioration of the photoelectric surface 20 can be suppressed and the increase of the after-pulses can be suppressed even in a case of being used in the high-temperature environment.

The third portion 63 of the aluminum oxide layer 60 is formed on the surface 14*a* of the tubular portion 14 on a side of the vacuum space S. According to this, the hydrogen gas or the helium gas can be suppressed from permeating through the tubular portion 14 and intruding into the container 10 from the outside, and in addition to this, the hydrogen gas or the helium gas existing inside the tubular portion 14 can be suppressed from being leaked to the inside of the container 10, and the increase of the after-pulses can be further suppressed.

The fourth portion 64 of the aluminum oxide layer 60 is formed on the surface 14*b* of the tubular portion 14 on a side opposite to the vacuum space S. According to this, the increase of the after-pulses can be more effectively suppressed.

The second portion 62 of the aluminum oxide layer 60 is formed on the second surface 13*b* of the window portion 13 on a side opposite to the vacuum space S. According to this, the hydrogen gas or the helium gas can be suppressed from permeating through the window portion 13 and intruding into the container 10.

The aluminum oxide layer 60 is the ALD layer. According to this, the aluminum oxide layer 60 can be densely formed, and the sensitivity deterioration of the photoelectric surface 20 and the increase of the after-pulses can be effectively suppressed.

The thickness of the aluminum oxide layer 60 is 10 nm or more and 30 nm or less. According to this, the sensitivity deterioration of the photoelectric surface 20 and the increase of the after-pulses can be effectively suppressed while suppressing transmission of light in the window portion 13 from being blocked by the aluminum oxide layer 60. That is, in a case where the thickness of the aluminum oxide layer 60 is 10 nm or more, the sensitivity deterioration of the photoelectric surface 20 and the increase of the after-pulses can be effectively suppressed. In addition, in a case where the thickness of the aluminum oxide layer 60 is 30 nm or less, it is possible to suppress transmission of the light L in the window portion 13 from being blocked by the first portion 61 and the fourth portion 64 of the aluminum oxide layer 60.

The aluminum oxide layer 60 is not formed on the stem portion 11. According to this, it is possible to omit man-hours and materials necessary for a process of forming the aluminum oxide layer 60 on the stem portion 11, and it is possible to make manufacturing easy. Note that, the aluminum oxide layer 60 may also be formed on the stem portion 11, and in this case, the gas barrier properties can be further improved. In this case, for example, the aluminum oxide layer 60 may be formed on the entirety of an inner surface and an outer surface of the container 10.

Note that, in a case where the third portion 63 of the aluminum oxide layer 60 is formed on the surface 14*a* of the tubular portion 14 on a side of the vacuum space S, a dark current may be slightly generated, but the increase of the after-pulses can be suppressed. Specifically, in a case where the aluminum oxide layer 60 does not include the third portion 63, since an alkali metal that is excessively introduced into the vacuum space S at the time of forming the photoelectric surface 20 is absorbed by the tubular portion 14, generation of the dark current caused by the excessively introduced alkali metal can be suppressed. On the other hand, in a case where the third portion 63 of the aluminum oxide layer 60 is formed on the surface 14*a* of the tubular portion 14 on a side of the vacuum space S, the alkali metal that is excessively introduced into the vacuum space S is less likely to be absorbed by the tubular portion 14, and a partial alkali metal may remain inside the vacuum space S, and thus there is a possibility that the dark current caused by the remaining alkali metal is generated. However, in a case of being used in the high-temperature environment, since suppression of the increase of the after-pulses is important, in the photomultiplier tube 1, the aluminum oxide layer 60 is formed on the surface 14*a* of the tubular portion 14 on a side of the vacuum space S to suppress the increase of the after-pulses.

Figure 2:
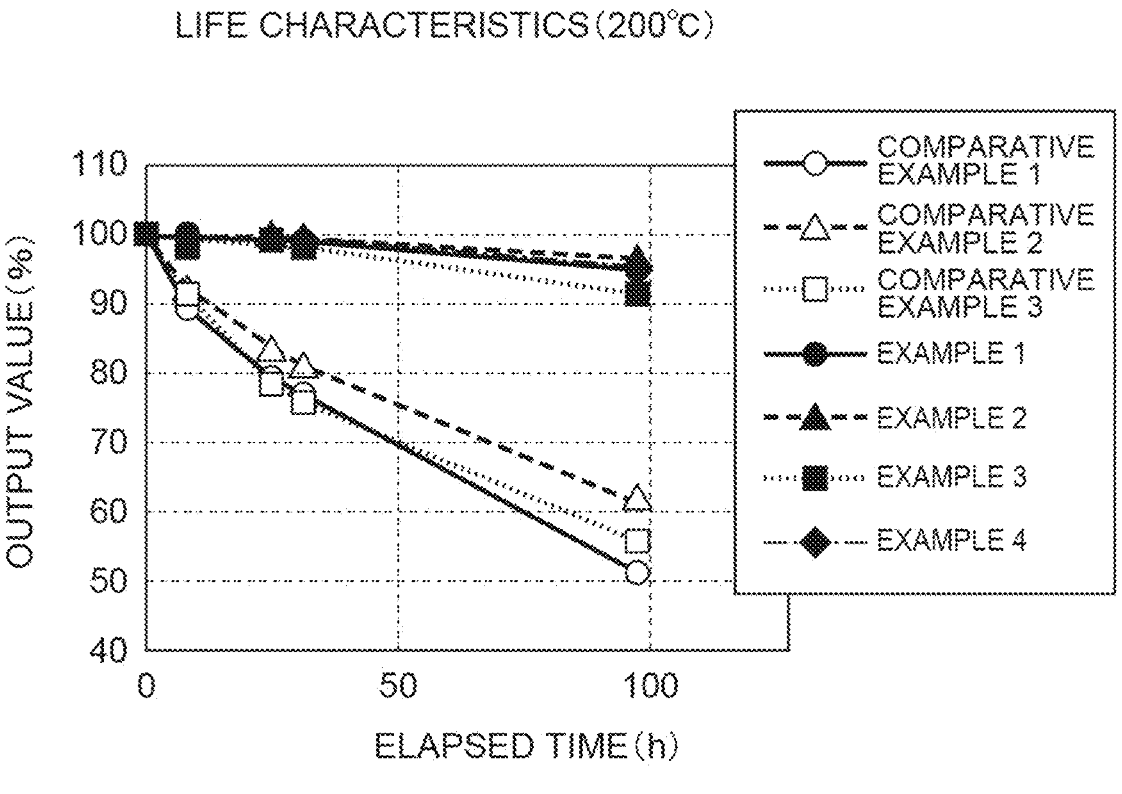
FIG. 2 is a graph illustrating a comparison result of life characteristics.

Hereinafter, a result of a confirmation experiment will be described with reference to FIG. 2 to FIG. 4C. FIG. 2 is a graph illustrating a comparison result of life characteristics. In this experiment, life characteristics were evaluated with respect to photomultiplier tubes of Examples 1 to 4, and Comparative Examples 1 to 3. Examples 1 to 4 correspond to a case where the thickness of the aluminum oxide layer 60 in the photomultiplier tube 1 of the embodiment is 20 nm, and Comparative Examples 1 to 3 correspond to a case where the aluminum oxide layer 60 is not provided in the photomultiplier tube 1 of the embodiment. In a state in which an ambient temperature is 200° C., each photomultiplier tube was operated and an output value was measured. In the graph in FIG. 2, the vertical axis represents an output value (%) when an output value after one hour from initiation of measurement is set to 100%, and the horizontal axis represents elapsed time from initiation of measurement. In this experiment, measurement was continued until the output value reaches 50% in any photomultiplier tube (here, Comparative Example 1).

From FIG. 2, when comparing output values of Examples 1 to 4 and output values of Comparative Examples 1 to 3 when terminating measurement (after approximately 100 hours), it can be understood that the output values of Examples 1 to 4 are higher than the output values of Comparative Examples 1 to 3, and Examples 1 to 4 had better life characteristics as compared with Comparative Examples 1 to 4.

FIG. 3 is a table showing a comparison result of after-pulses. In this experiment, an increase rate of the after-pulses was measured with respect to photomultiplier tubes of a first example, a second example, and a comparative example. The first example and the second example correspond to a case where the thickness of the aluminum oxide layer 60 in the photomultiplier tube 1 of the embodiment is 10 nm, and 20 nm, respectively, and the comparative example corresponds to a case where the aluminum oxide layer 60 is not provided in the photomultiplier tube 1 of the embodiment. In a state in which the ambient temperature was 200° C., each of the photomultiplier tubes was stored for 20 hours in an inoperative state, and the increase rate of the after-pulses when operating the photomultiplier tube after elapse of 20 hours from initiation of storage was measured. The number of samples (N) of the first example, the second example, and the comparative example was set to 5, and an average value regarding the five samples was set as the increase rate of the after-pulses.

In the comparative example, increase rates of the after-pulses of five samples were 165%, 200%, 194%, 239%, and 213%, respectively, and an average value was 202%. In the first example, increase rates of the after-pulses of five samples were 184%, 202%, 161%, 177%, and 167%, respectively, and an average value was 178%. In the second example, increase rates of the after-pulses of five samples were 165%, 156%, 143%, 145%, and 171%, respectively, and an average value was 156%.

From FIG. 3, it can be understood that the increase rate of the after-pulses of the first example and the second example were smaller than the increase rate of the after-pulses of the comparative example. From this, it can be understood that the increase of the after-pulses can be suppressed by forming the aluminum oxide layer 60. In addition, the increase rate of the after-pulses of the second example was smaller than the increase rate of the after-pulses of the first example. From this, it can be understood that as the aluminum oxide layer 60 is thicker, the increase of the after-pulses can be more effectively suppressed.

Note that, the after-pulses are pseudo pulses observed after an output pulse corresponding to incidence of light of a detection object, and are generated in a case where a hydrogen gas, a helium gas, or the like exists inside the container 10. As the amount of gas existing inside the container 10 is larger, the after-pulses are observed as a larger peak. In addition, the after-pulses further increase as a period for which the photomultiplier tube is stored in an inoperative state is longer. Since the after-pulses may have an influence on detection accuracy of the photomultiplier tube, it is required to suppress the after-pulses.

Figure 4A:
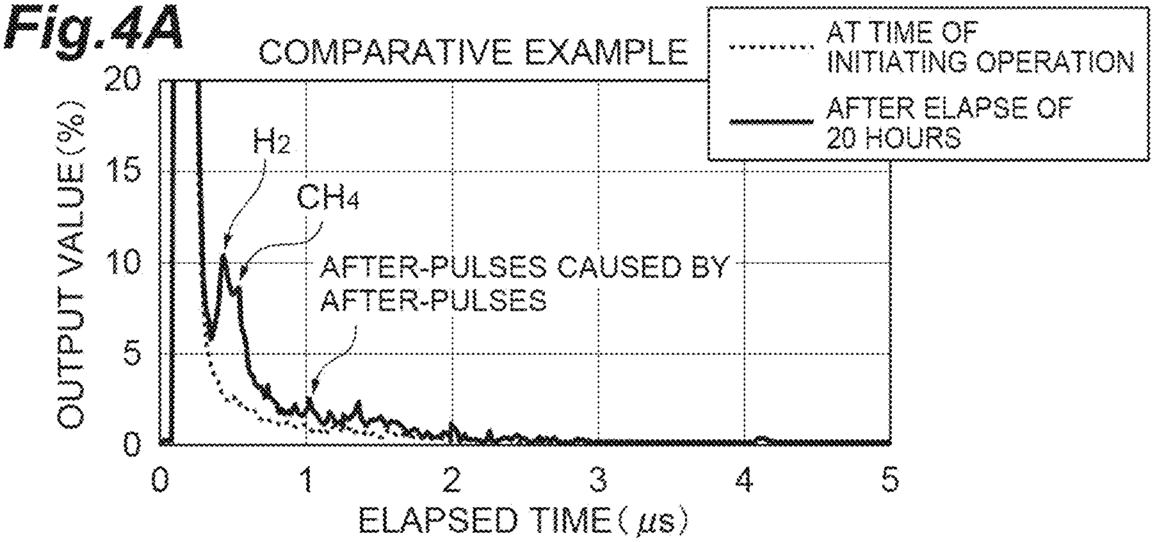
FIGS. 4A to 4C are graphs illustrating measurement results of after-pulses.
Figure 4B:
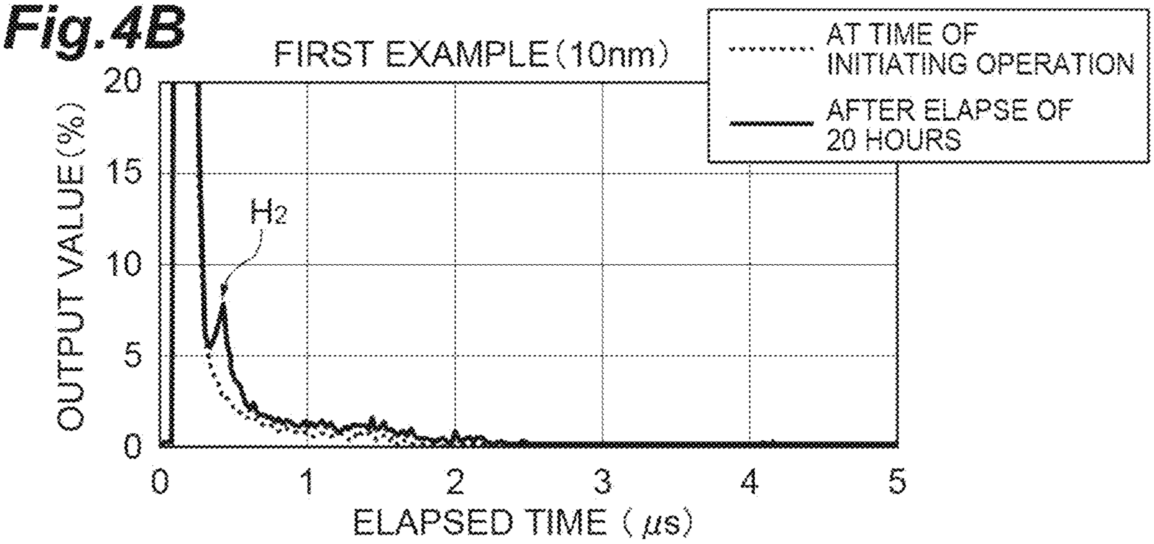
Figure 4C:
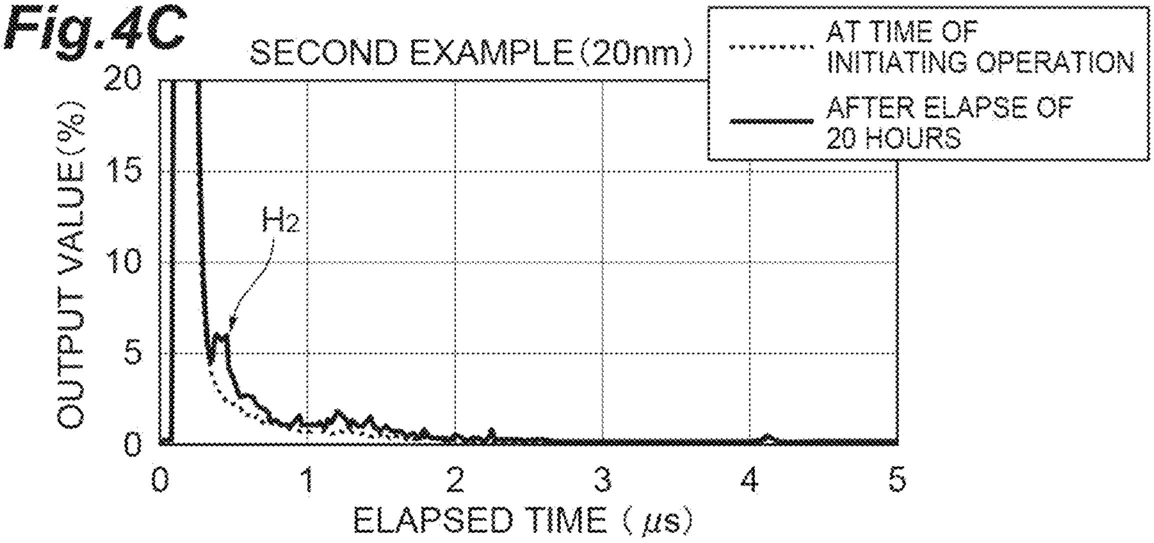

FIGS. 4A to 4C are graphs showing a measurement result of the after-pulses regarding the first example, the second example, and the comparative example. The first example, the second example, the comparative example, and operation conditions in this experiment are the same as those in the experiment in FIG. 3. The vertical axis represents an output value, and the horizontal axis represents elapsed time.

As illustrated in FIG. 4A, in a case of the comparative example, after-pulses caused by a hydrogen gas ($H_2$) and a methane gas ($CH_4$) were detected after elapse of 20 hours. In addition, after-pulses caused by the after-pulses were also detected. On the other hand, as illustrated in FIG. 4B and FIG. 4C, in a case of the first example, and the second example, after-pulses caused by a hydrogen gas were detected after elapse of 20 hours, but the after-pulses were smaller as compared with the case of the comparative example. From this, it can be understood that the increase of the after-pulses can be suppressed by forming the aluminum oxide layer 60.

In addition, when comparing the first example and the second example with each other, the after-pulses of the second example were smaller than the after-pulses of the first example. From this, it can be understood that as the aluminum oxide layer 60 is thicker, the increase of the after-pulses can be more effectively suppressed. Note that, in FIGS. 4A to 4C, a suppression effect of the after-pulses caused by the hydrogen gas is illustrated, but it is considered that after-pulses caused by the helium gas are suppressed in a similar manner.

MODIFICATION EXAMPLES

Figure 5:
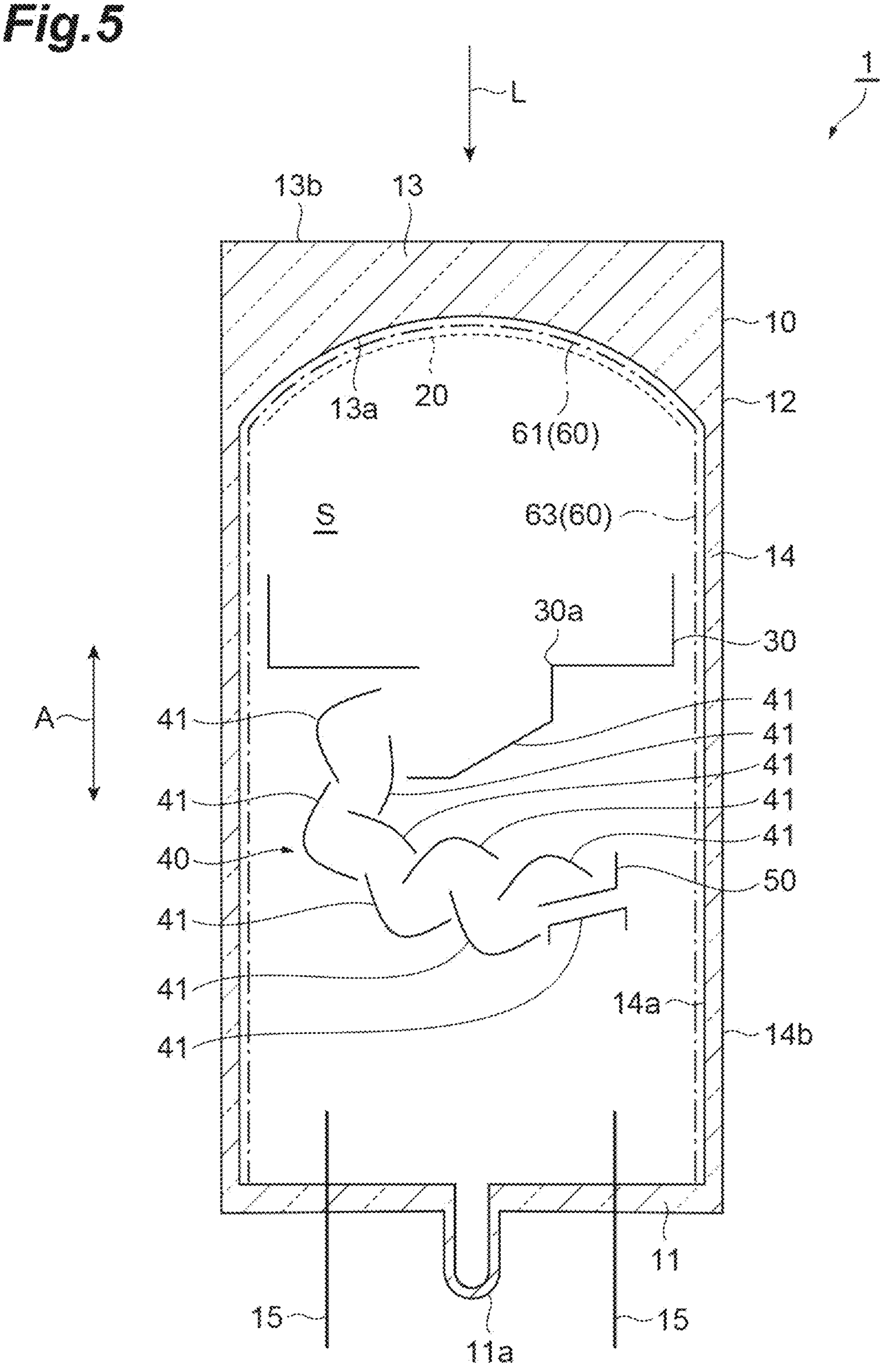
FIG. 5 is a cross-sectional view of a photomultiplier tube according to a first modification example.
Figure 6:
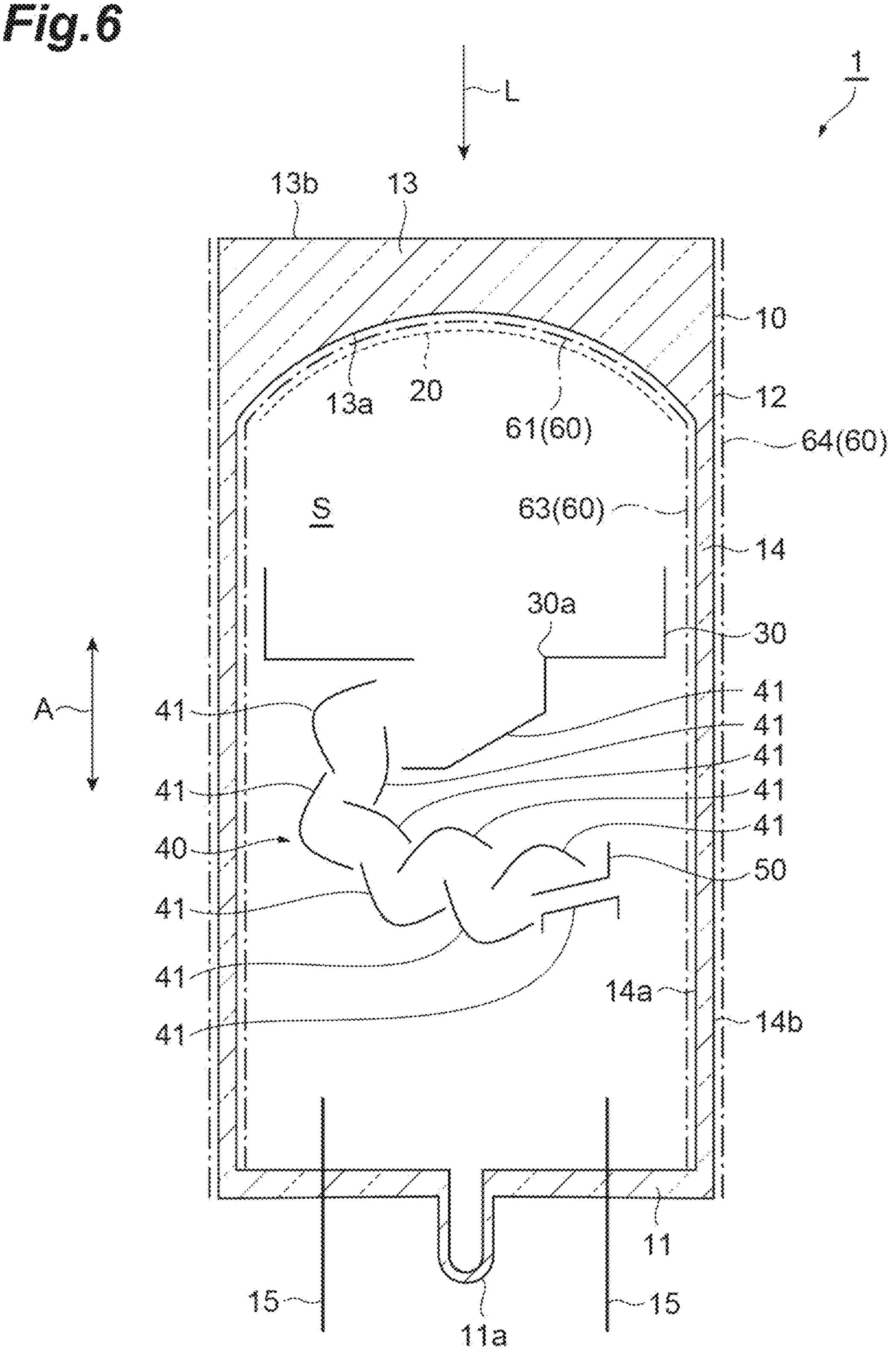
FIG. 6 is a cross-sectional view of a photomultiplier tube according to a second modification example.

In a first modification example illustrated in FIG. 5, the aluminum oxide layer 60 does not include the second portion 62 and the fourth portion 64, and includes only the first portion 61 and the third portion 63. In a second modification example illustrated in FIG. 6, the aluminum oxide layer 60 does not include the second portion 62, and includes only the first portion 61, the third portion 63, and the fourth portion 64. In the first modification example and the second modification example, as in the above-described embodiment, the sensitivity deterioration of the photoelectric surface and the increase of the after-pulses can be suppressed even in a case of being used in the high-temperature environment.

In addition, in the first modification example and the second modification example, the aluminum oxide layer 60 does not include the second portion 62. That is, the aluminum oxide layer 60 is not formed on the second surface 13*b* of the window portion 13 on a side opposite to the vacuum space S. In this case, it is possible to suppress transmission of light in the window portion 13 from being blocked by the aluminum oxide layer 60. On the other hand, from the manufacturing viewpoint, it is preferable that the aluminum oxide layer 60 includes the second portion 62 as in the above-described embodiment. That is, in a case of forming the aluminum oxide layer 60 by the ALD method, since a configuration in which the aluminum oxide layer 60 is formed on the entire surface of the valve portion 12 is easier than a configuration in which the aluminum oxide layer 60 is formed except for the second portion 62, from the manufacturing viewpoint, it is preferable that the aluminum oxide layer 60 includes the second portion 62.

The present disclosure is not limited to the above-described embodiment and modification examples. For example, materials and shapes of respective configurations are not limited to the materials and the shapes described above, and various materials and shapes can be employed. The aluminum oxide layer 60 may not be the ALD layer. For example, the aluminum oxide layer 60 may be formed by electron beam deposition, sputter deposition, coating, or the like. An underlayer may be provided between the aluminum oxide layer 60 and the photoelectric surface 20. The underlayer is, for example, a beryllium oxide (BeO) layer.

A protective layer formed of a material other than aluminum oxide may be provided instead of the aluminum oxide layer 60. Examples of materials of the protective layer include an oxide and an oxynitride of trivalent metal elements of Group 3 or Group 13 such as aluminum oxynitride (AlON), yttrium oxide ($Y_2O_3$), and lanthanum oxide ($La_2O_3$). The oxynitride is a kind of oxides. In addition, the protective layer is not limited to a layer formed of a single material, and may be a layer formed of a plurality of materials such as an alternating laminated film of aluminum oxide and silicon oxide ($SiO_2$). On the other hand, examples of materials not suitable for the protective layer include titanium oxide ($TiO_2$), silicon oxide ($SiO_2$), magnesium fluoride ($MgF_2$), magnesium oxide (MgO), tantalum oxynitride (TaON), hafnium oxide ($HfO_2$), and the like.

Figure 7A:
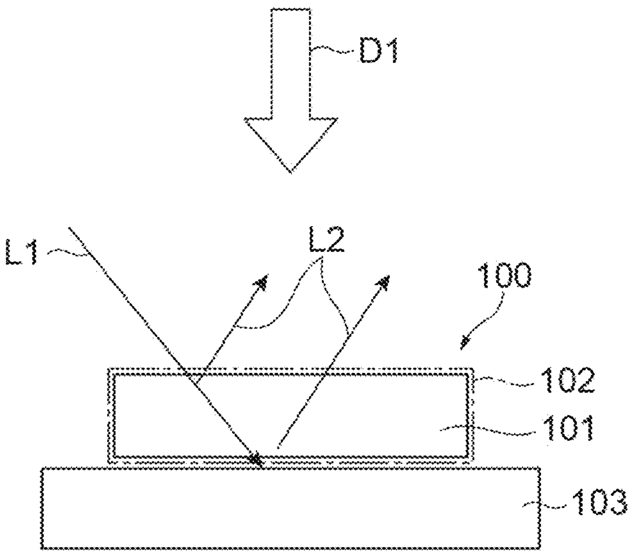
FIGS. 7A and 7B are views describing a first experiment and a second experiment.
Figure 7B:
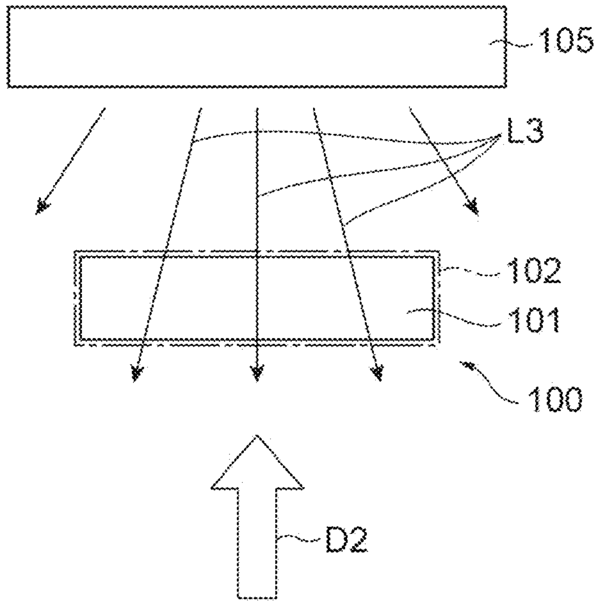
Figure 9A:
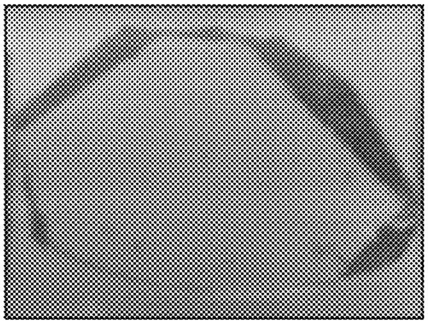
FIGS. 9A to 9D are photographs of Sample 1 to Sample 3 in the first experiment.
Figure 9B:
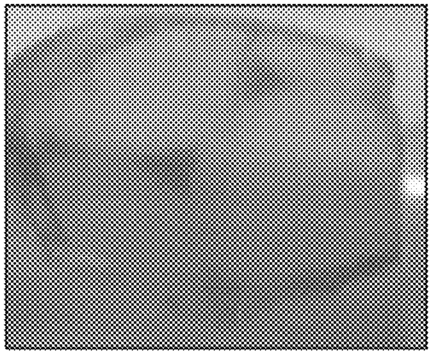
Figure 9C:
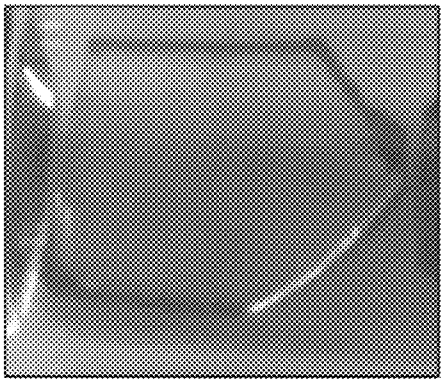
Figure 9D:
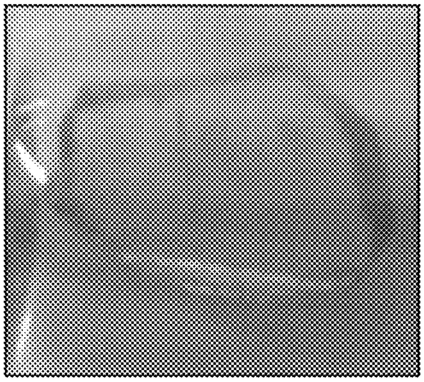
Figure 10A:
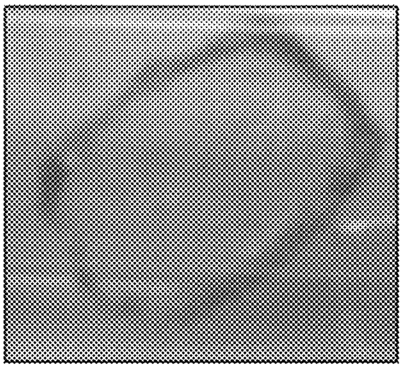
FIGS. 10A to 10C are photographs of Sample 4 and Sample 5 in the first experiment.
Figure 10B:
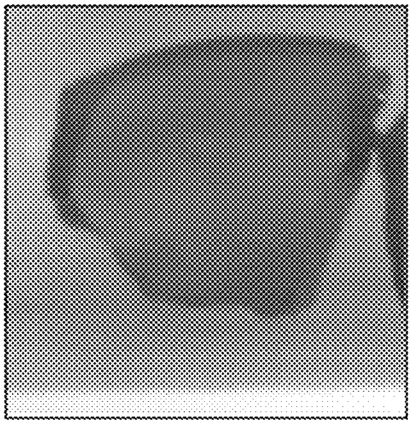
Figure 10C:
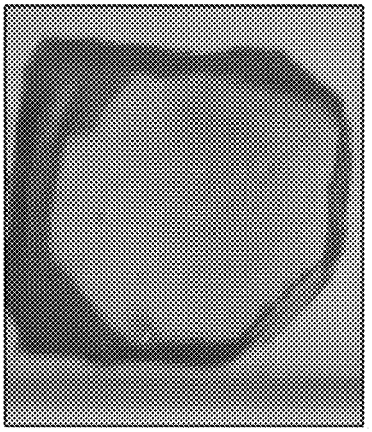
Figure 11A:
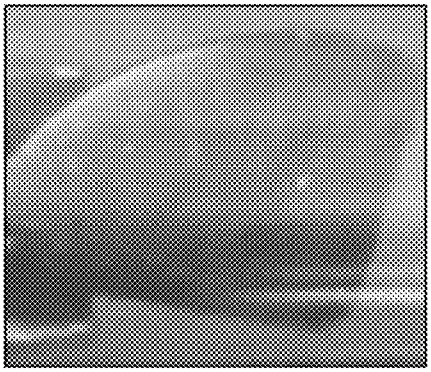
FIGS. 11A to 11D are photographs of Sample 6 to Sample 9 in the first experiment.
Figure 11B:
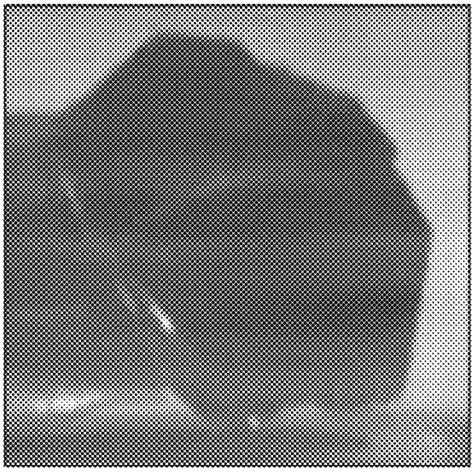
Figure 11C:
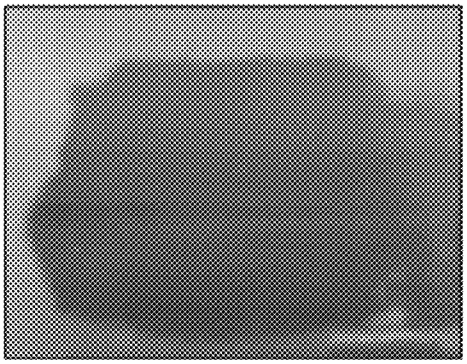
Figure 11D:
Figure 12A:
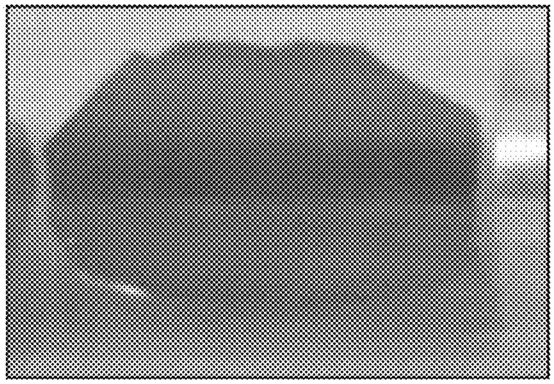
FIGS. 12A to 12C are photographs of Sample 10 to Sample 12 in the first experiment.
Figure 12B:
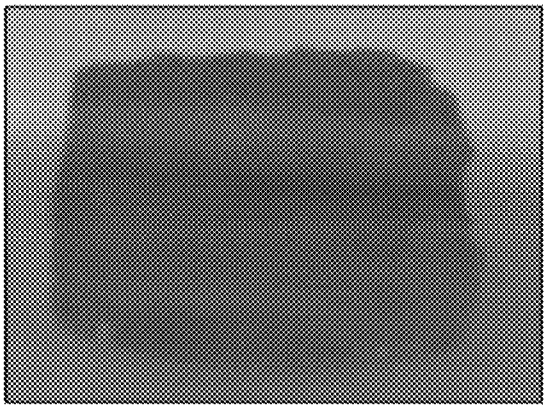
Figure 12C:
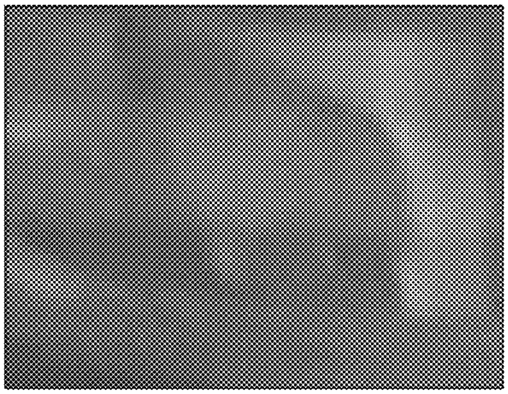
Figure 13A:
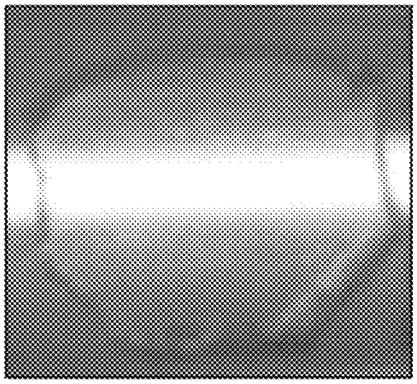
FIGS. 13A to 13D are photographs of Sample 1 to Sample 3 in the second experiment.
Figure 13B:
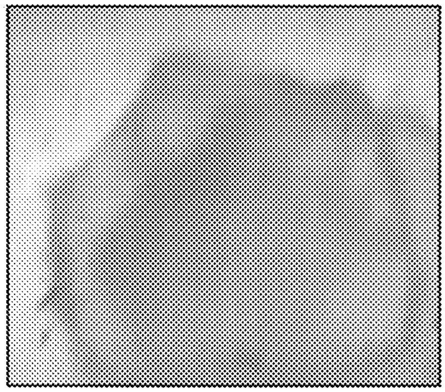
Figure 13C:
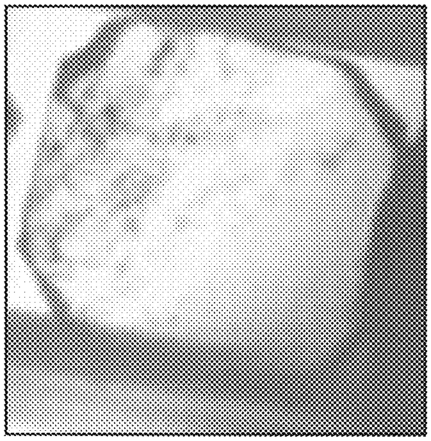
Figure 13D:
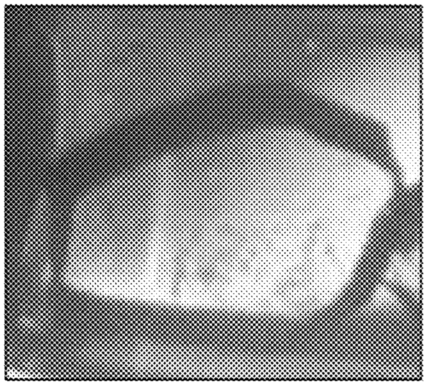
Figure 14A:
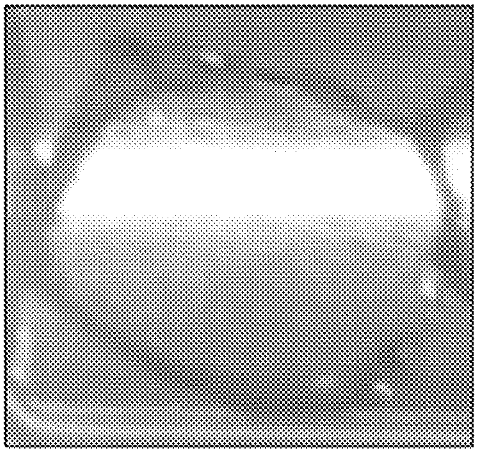
FIGS. 14A to 14C are photographs of Sample 4 and Sample 5 in the second experiment.
Figure 14B:
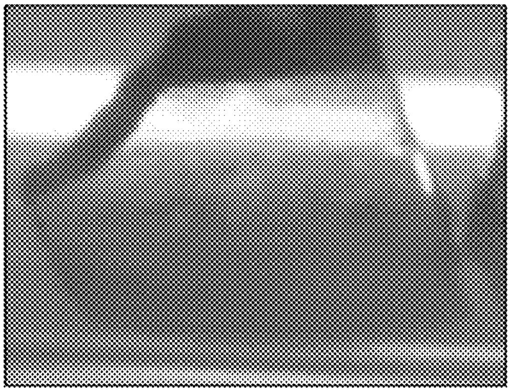
Figure 14C:
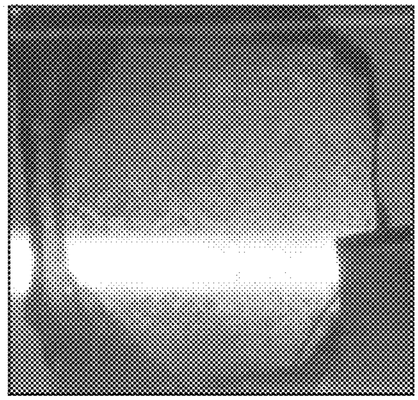
Figure 15A:
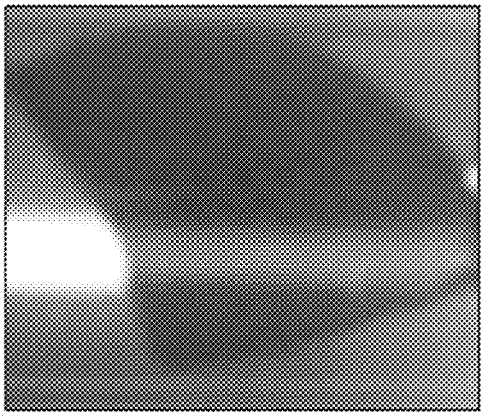
FIGS. 15A to 15D are photographs of Sample 6 to Sample 9 in the second experiment.
Figure 15B:
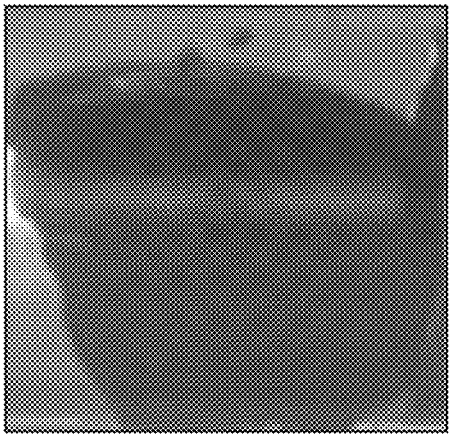
Figure 15C:
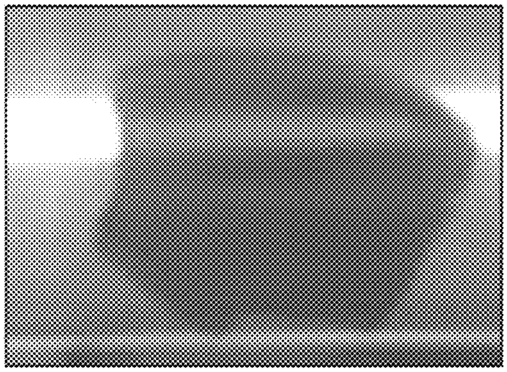
Figure 15D:
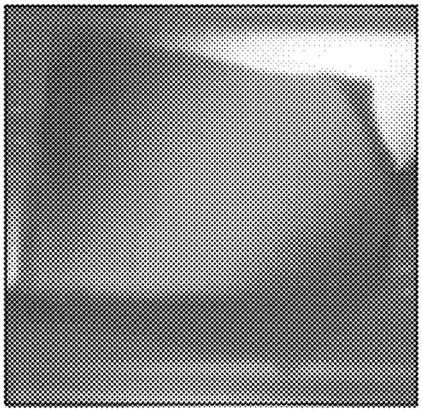
Figure 16A:
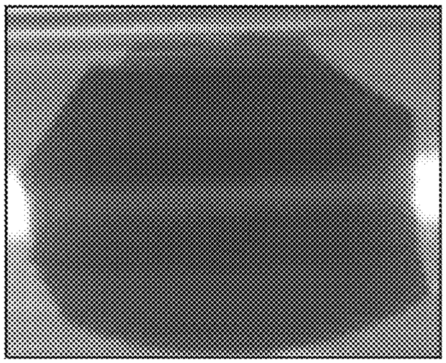
FIGS. 16A to 16C are photographs of Sample 10 to Sample 12 in the second experiment.
Figure 16B:
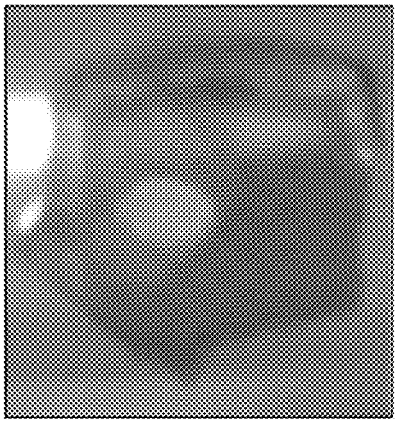
Figure 16C:
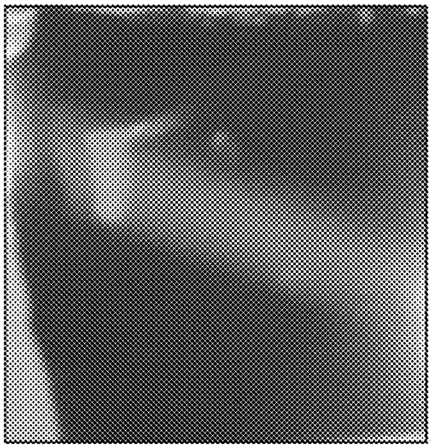

Hereinafter, results of an effective experiment will be described with reference to FIG. 7A to FIG. 16C. In the experiment, an alkali blocking effect (life characteristics) of the protective layer was confirmed. As illustrated in FIGS. 7A and 7B, a sample 100 was prepared by coating quartz glass 101 with a protective film 102. After the sample 100 was exposed to a sodium vapor kept at 400° C. to 500° C., the degree intrusion of alkali (sodium) into the sample 100 was confirmed. Since the quartz glass 101 and the protective film 102 discolor into black when the alkali intrudes, it is possible to evaluate an alkali blocking effect of the protective film 102 by confirming the degree of discoloration. That is, there is a correlation between appearance of the sample 100 and the alkali blocking effect. Experiments were conducted on eleven kinds of Samples 1 to 11 (No. 1 to No. 11) different in a material of the protective film 102, and Sample 12 (No. 12) in which the protective film 102 is not formed. A configuration of each sample will be described later with reference to FIG. 8.

Two experiments, that is, a first experiment and a second experiment were conducted. In the first experiment, as illustrated in FIG. 7A, the sample 100 after being exposed to the sodium vapor was disposed on white paper 103, and the sample 100 was observed from a direction D1 (from a side opposite to the paper 103). According to this, appearance of the sample 100 by reflected light L2 in a case where light L1 is incident to the sample 100 was confirmed. The light L1 is light from a fluorescent lamp. In a case where the sample 100 looked transparent, it was determined that there is no intrusion of alkali and the alkali blocking effect by the protective film 102 is good. In a case where the sample 100 looked black and opaque, it was determined that there is intrusion of alkali, and the alkali blocking effect of the protective film 102 is poor.

In the second experiment, as illustrated in FIG. 7B, the sample 100 after being exposed to the sodium vapor was disposed in front of a fluorescent lamp 105, and the sample 100 was observed from a direction D2 (a side opposite to the fluorescent lamp 105). According to this, the appearance of the sample 100 by transmitted light of light L3 from the fluorescent lamp 105 was confirmed. In a case where the sample 100 looked bright, it was determined that there is no intrusion of alkali, and the alkali blocking effect is good. In a case where the sample 100 looked dark, it was determined that there is intrusion of alkali, and the alkali blocking effect of the protective film 102 is poor.

FIG. 8 is a table showing experiment results of the first experiment and the second experiment. In a column of "Alkali blocking effect", a material marked with "o" indicates that the material has a good alkali blocking effect, and a material marked with "x" indicates that the material does not have a good alkali blocking effect.

As illustrated in FIG. 8, the protective films 102 of Samples 1, 3, and 5 to 11 are formed of aluminum oxide, yttrium oxide, lanthanum oxide, magnesium oxide, silicon oxide, titanium oxide, hafnium oxide, tantalum oxynitride, and magnesium fluoride, respectively. The protective film 102 of Sample 2 is formed of aluminum oxynitride that is a mixture of aluminum oxide and aluminum nitride. The protective film 102 of Sample 4 has a structure in which three pairs of aluminum oxide and silicon oxide are laminated. The protective films 102 of Samples 1, 2, 4, 6 to 8, 10, and 11 are ALD films, and the protective films 102 of Samples 3, 5, and 9 are electron beam deposited films.

Materials (aluminum oxide, aluminum oxynitride, yttrium oxide, silicon oxide, and lanthanum oxide) of the protective films 102 of Samples 1 to 5 are trivalent metal oxides. Materials (yttrium oxide and lanthanum oxide) of the protective films 102 of Samples 3 and 5 are rare-earth metal oxides. A material (magnesium oxide) of the protective film 102 of Sample 6 is a divalent metal oxide. A material (silicon oxide) of the protective film 102 of Sample 7 is a tetravalent non-metal oxide. Materials (titanium oxide and hafnium oxide) of the protective films 102 of Samples 8 and 9 are tetravalent metal oxides. A material (tantalum oxynitride) of the protective film 102 of Sample 10 is a pentavalent metal oxide. A material (magnesium fluoride) of the protective film 102 of Sample 11 is not an oxide.

As illustrated in FIG. 8, the alkali blocking effect was good for Samples 1 to 5, but the alkali blocking effect was poor for Samples 6 to 12. From this, it can be understood that all of the materials of the protective films 102 of Samples 1 to 5 with good alkali blocking effect are trivalent metal oxides (trivalent metal oxides of Group 3 or Group 13) (including oxynitrides).

FIG. 9A to FIG. 16C are photographs of experiment results in the first experiment and the second experiment. FIG. 9A to FIG. 12C are photographs of experiment results in the first experiment, and FIG. 13A to FIG. 16C are photographs of experiment results in the second experiment. As illustrated in FIG. 9A to FIG. 16C, Samples 1 to 5 had good appearance in the first experiment and the second experiment. On the other hand, Samples 6 to 12 had poor appearance in the first experiment and the second experiment. Note that, photographs of FIG. 15A to FIG. 16C are black and white, but actually, Samples 6 to 12 in the second experiment appeared to have a color including red. Note that, as an experiment separate from the first experiment and the second experiment, a protective film was formed on an inner wall of a vacuum tube, and gas analysis was performed. According to this, it was confirmed that two samples (a sample in which the protective film is formed of aluminum oxide and a sample in which the protective film has a structure in which three pairs of aluminum oxide and silicon oxide are laminated) corresponding to Samples 1 and 4 described above have good gas barrier properties.

In the above-described embodiment, the entirety of the aluminum oxide layer 60 is formed in a uniform thickness, but may be formed to have partially different thicknesses. For example, the thickness of the third portion 63 and the fourth portion 64 formed on the tubular portion 14 may be larger than the thickness of the first portion 61 and the second portion 62 of the aluminum oxide layer 60 formed on the window portion 13. In this case, it is possible to suppress a hydrogen gas or a helium gas from permeating through the tubular portion 14 and intruding into the container 10 due to the third portion 63 and the fourth portion 64 while suppressing transmission of light in the window portion 13 from being blocked by the first portion 61 and the second portion 62.

The thickness of the first portion 61 of the aluminum oxide layer 60 may be 5 nm (50 Å) or more. In this case, an effect of suppressing sensitivity deterioration (alkali blocking effect) of the photoelectric surface 20 can be obtained. The thickness of the first portion 61 may be 300 nm or less. In this case, since a refractive index of the aluminum oxide layer 60 is a value between a refractive index of the window portion 13 and a refractive index of the photoelectric surface 20, it is possible to suppress the light L incident from the window portion 13 from being reflected by the first portion 61.

Results of experiments for confirming the gas barrier properties will be described with reference to FIG. 17 and FIGS. 18A and 18B. FIG. 17 is a table showing a comparison result of after-pulses regarding a third example and a third comparative example. In this experiment, an increase rate of the after-pulses was measured with respect to photomultiplier tubes of the third example and the third comparative example. The third example corresponds to a case where a protective layer (yttrium oxide layer) formed of yttrium oxide is provided in the photomultiplier tube 1 of the embodiment instead of the aluminum oxide layer 60. In the third example, the yttrium oxide layer was formed by electron beam deposition. The thickness of the yttrium oxide layer was set to 100 nm (1000 Å). The third comparative example corresponds to a case where the aluminum oxide layer 60 (protective layer) is not provided in the photomultiplier tube 1 of the embodiment. As in the experiment in FIG. 3 described above, in a state in which the ambient temperature was 200° C., each of the photomultiplier tubes was stored for 20 hours in an inoperative state, and the increase rate of the after-pulses when operating the photomultiplier tube after elapse of 20 hours from initiation of storage was measured. The number of samples (N) of the third example and the third comparative example was set to 5, and an average value regarding the five samples was set as the increase rate of the after-pulses.

In the third comparative example, increase rates of the after-pulses of five samples were 276%, 219%, 236%, 299%, and 319%, respectively, and an average value was 270%. In the third example, increase rates of the after-pulses of five samples were 274%, 202%, 247%, 228%, and 255%, respectively, and an average value was 241%.

From FIG. 17, it can be understood that the increase rate of the after-pulses of the third example was smaller than the increase rate of the after-pulses of the third comparative example. From this, it can be understood that the increase of the after-pulses can be suppressed by forming the yttrium oxide layer.

Figure 18A:
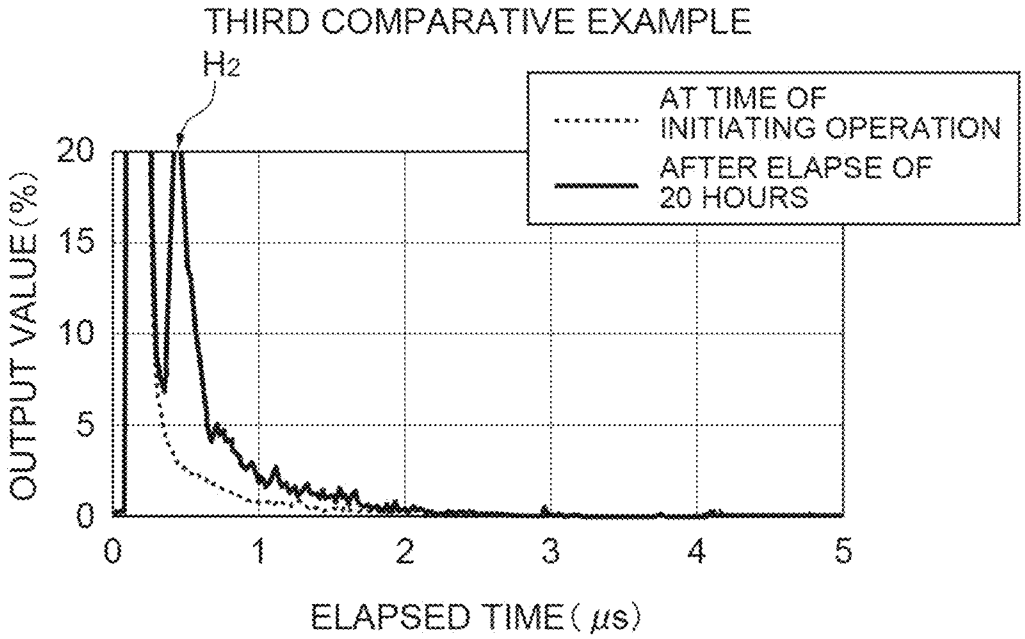
FIGS. 18A and 18B are graphs illustrating measurement results of after-pulses according to the third example and the third comparative example.
Figure 18B:
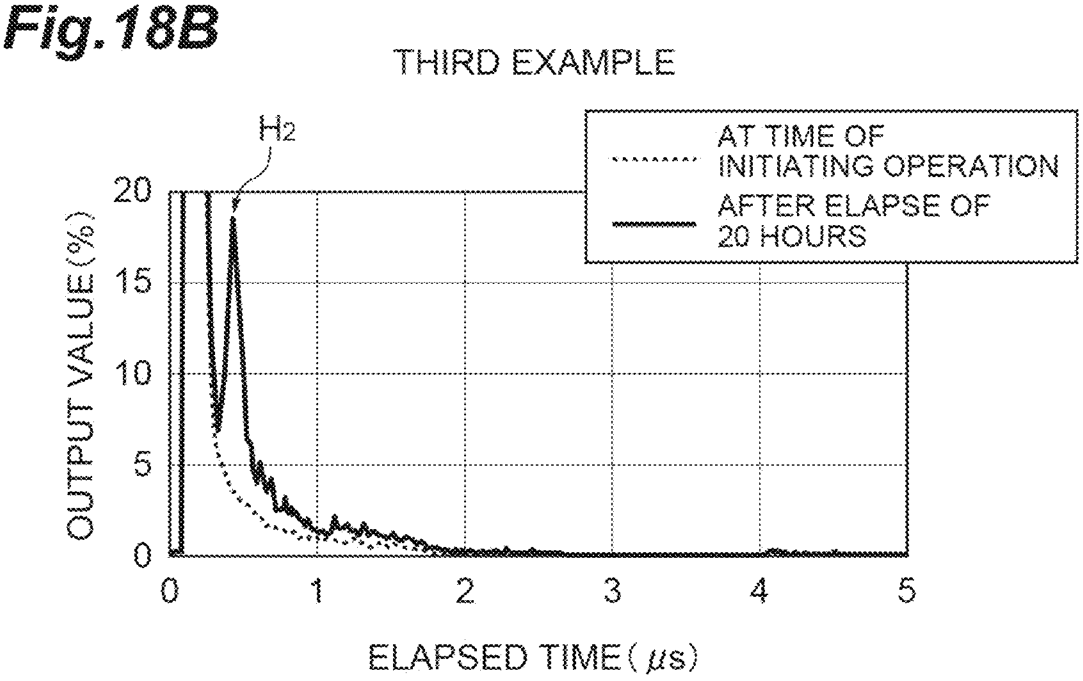

FIGS. 18A and 18B are graphs illustrating measurement results of the after-pulses regarding the third example and the third comparative example. The third example, the third comparative example, and operation conditions in this experiment are the same as in the experiment in FIG. 17. The vertical axis represents an output value, and the horizontal axis represents elapsed time.

As illustrated in FIG. 18A, in a case of the third comparative example, after-pulses caused by a hydrogen gas ($H_2$) were detected after elapse of 20 hours. On the other hand, as illustrated in FIG. 18B, in a case of the third example, the after-pulses caused by the hydrogen gas were detected after elapse of 20 hours, but the after-pulses were smaller as compared with the case of the third comparative example. From this, it can be understood that the increase of the after-pulses can be suppressed by forming the yttrium oxide layer.

From FIG. 17 and FIGS. 18A and 18B, in the photomultiplier tube 1 of the embodiment, it can be understood that the increase of the after-pulses can be suppressed (the gas barrier properties can be raised) even in a case where the yttrium oxide layer is provided instead of the aluminum oxide layer 60. Note that, in Example 3, the thickness of the yttrium oxide layer was 100 nm, but the thickness of the yttrium oxide layer may be 10 nm or more and 100 nm or less, and even in this case, the gas barrier properties can be raised as in Example 3.

What is claimed is:

1. A photomultiplier tube, comprising:

a container including a window portion formed of a light-transmitting material, and a tubular portion that is connected to the window portion and defines a vacuum space in combination with the window portion;

a photoelectric surface that is formed of a photoelectron-emitting material consisting of sodium, potassium, and antimony, is provided on a surface of the window portion on a side of the vacuum space, and emits photoelectrons in correspondence with incident light; and an electron multiplier that emits secondary electrons in correspondence with incidence of the photoelectrons emitted from the photoelectric surface, and multiplies the secondary electrons, wherein a protective layer including a trivalent metal oxide of Group 3 or Group 13 is formed between the photoelectric surface and the window portion and on a surface of the tubular portion.

2. The photomultiplier tube according to claim 1, wherein the protective layer is formed on a surface of the tubular portion on a side of the vacuum space.

3. The photomultiplier tube according to claim 2, wherein the protective layer is formed on a surface of the tubular portion on a side opposite to the vacuum space.

4. The photomultiplier tube according to claim 2, wherein the protective layer is exposed to the vacuum space.

5. The photomultiplier tube according to claim 1, wherein the protective layer is further formed on a surface of the window portion on a side opposite to the vacuum space.

6. The photomultiplier tube according to claim 1, wherein the protective layer is an ALD layer.

7. The photomultiplier tube according to claim 1, wherein the thickness of the protective layer is 10 nm or more and 100 nm or less.

8. The photomultiplier tube according to claim 1, wherein the protective layer is an aluminum oxide layer.

9. The photomultiplier tube according to claim 8, wherein the thickness of the protective layer is 10 nm or more and 30 nm or less.

10. The photomultiplier tube according to claim 1, wherein the protective layer is an yttrium oxide layer.

11. The photomultiplier tube according to claim 10, wherein the thickness of the protective layer is 10 nm or more and 100 nm or less.

12. The photomultiplier tube according to claim 1, wherein the protective layer is formed directly on the surface of the tubular portion.

* * * * *